Oct. 4, 1960
E. SCHASCHL ET AL
2,955,018
CORROSION INHIBITION
Filed Jan. 24, 1957
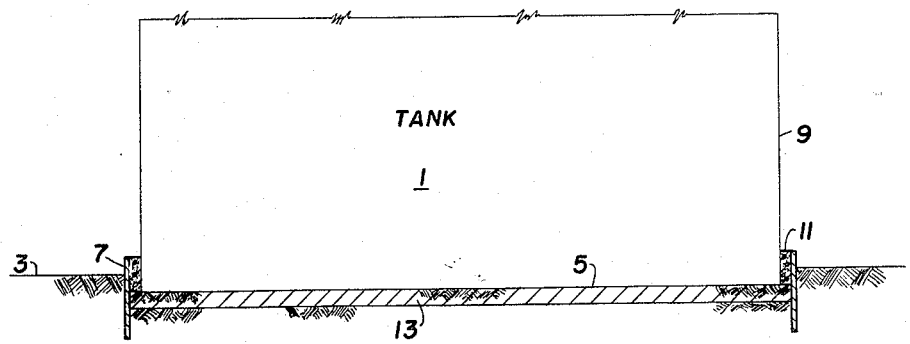
INVENTORS
EDWARD SCHASCHL
BY GLENN A. MARSH
ATTORNEY

United States Patent Office 2,955,018
Patented Oct. 4, 1960

2,955,018

CORROSION INHIBITION

Edward Schaschl and Glenn A. Marsh, Crystal Lake, Ill., assignors to The Pure Oil Company, Chicago, Ill., a corporation of Ohio Filed Jan. 24, 1957, Ser. No. 636,137

5 Claims. (Cl. 21—2.5)

This invention relates to a method and means for protecting metal storage tanks in contact with the ground from corrosion.

It is common practice in the petroleum and other industries to store liquid and gaseous products in steel tanks which are set on top of but in contact with the ground surface. Oxygen diffusing through the ground sets up cathodic areas at or near the periphery of the tank while the center portion of the bottom area in contact with the ground remains anodic with respect to the peripheral zone. This process causes corrosion at or near the center portion of the tank bottom.

We have discovered that corrosion of tank bottoms in contact with the ground can be substantially eliminated or greatly mitigated by surrounding the tank with a fluid-impermeable barrier which extends into the earth a sufficient distance to prevent diffused oxygen from reaching the tank bottom and forms a seal between the side walls of the tank and the barrier to prevent leakage of oxygen between the tank and the barrier.

It is an object of our invention to provide a method for inhibiting corrosion of metallic tank bottoms in contact with the earth's surface. Another object of our invention is to provide a structure which will protect tank bottoms in contact with the earth from corrosion.

The single figure of the accompanying drawing is an elevational view with parts in section, which illustrates the invention.

Referring to the drawing, numeral 1 indicates the lower portion of a cylindrical tank, such as is commonly used for the storage of crude oil, gasoline and other petroleum products. The tank may be made of steel. Numeral 3 indicates the ground level. The tank is set on the ground with its bottom 5 a few inches below the ground level. A sheet of steel, aluminum or other gas-impervious material, such as polyethylene or polyfluorinated hydrocarbons 7, encircles the bottom of the tank with the top of the sheet extending a few inches above the ground level and the bottom of the sheet extending to a depth of approximately 2 to 3 ft. below the bottom of the tank. In the event that barrier sheet 7 is made of metal it is spaced a short distance from side-wall 9 of the tank and the space between barrier 7 and side-wall 9 is sealed with a sealing material such as cement, mortar, asphalt or other inert material, such as rosin or synthetic plastics which may be melted upon heating and solidify upon cooling. Seal 11 prevents air from diffusing from the atmosphere into the ground between the barrier and the tank.

If desired, earth 13 immediately below and confined within barrier 7 may be treated with one or more chemicals capable of absorbing oxygen as, for example, sodium sulfite or hydrazine. This earth may also be mixed with an alkaline substance such as limestone to assist the oxygen acceptor in absorbing any oxygen which may gain access to the area below the bottom of the tank.

As a specific example, a steel gasoline storage tank having a diameter of 20 ft. was placed with its bottom resting 6 in. below the ground surface. A steel sheet of 1/8 in. thickness, having a width of 36 in., was placed around the tank and the ends welded together. The circular sheet was driven into the ground to a depth of 30 in. and at a distance of 2 in. from the side wall of the tank so that 6 in. extended above the ground level. The space between the side wall of the tank and the sheet extending above the ground level was filled with molten asphalt.

By employing our invention it is possible to protect the tank bottom for periods of 2 to 10 years before the barrier sheet corrodes or develops holes. When this occurs the barrier sheet is removed and replaced with a new sheet.

We claim as our invention:

1. In combination with a steel tank having a bottom supported on and exposed to the ground soil substantially at ground level, a fluid impermeable sheet made of material from the group consisting of aluminum, steel, polyethylene and polyfluorinated hydrocarbons surrounding the lower portion of said tank and being spaced therefrom, said sheet extending vertically into the ground to a point about two to three feet below the bottom of said tank and a short distance above the ground surface and fluid sealing means in the annular space between said sheet and tank, above the ground surface, selected from the group consisting of cement, mortar, asphalt, rosin and thermoplastic synthetic resins.

2. The combination in accordance with claim 1 in which the sheet is steel.

3. The combination in accordance with claim 2 in which the sealing means is asphalt.

4. The method of protecting a steel tank, supported on and exposed to ground soil, from exterior corrosion which consists in placing an imperforate barrier sheet made of material from the group consisting of aluminum, steel, polyethylene and polyfluorinated hydrocarbons around and spaced from the lower portion of said tank with the bottom of said sheet extending about two to three feet below the bottom of said tank and the top of said barrier extending a few inches above the ground surface, and forming an air-tight solid seal in the space above the ground surface between said barrier and tank with a substance inert to atmosphere attack from the group consisting of cement, mortar, asphalt, rosin and thermoplastic synthetic resins.

5. Method in accordance with claim 4 in which the soil immediately below the tank bottom is treated with a chemical which readily combines with oxygen selected from the group consisting of sodium sulfite and hydrazine.

References Cited in the file of this patent

UNITED STATES PATENTS

| | | |
|---|---|---|
| 55,970 | Jacovenco | June 26, 1866 |
| 1,952,705 | Egloff | Mar. 27, 1934 |

OTHER REFERENCES

Calamari: Modern Packaging, February 1945, pp. 125, 126 and 146.

Vernon: Corrosion Prevention and Control, January 1955, pp. 23, 24.

Esso Protective Coatings Rust Ban, 1938, Lubetext D239-J8 (7 pp.).